United States Patent
Suzuki et al.

(10) Patent No.: US 12,503,068 B2
(45) Date of Patent: Dec. 23, 2025

(54) VEHICLE CONTROL DEVICE

(71) Applicant: HITACHI ASTEMO, LTD., Hitachinaka (JP)

(72) Inventors: Motomune Suzuki, Tokyo (JP); Hideyuki Sakamoto, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 398 days.

(21) Appl. No.: 18/253,952

(22) PCT Filed: Sep. 7, 2021

(86) PCT No.: PCT/JP2021/032907
§ 371 (c)(1),
(2) Date: May 23, 2023

(87) PCT Pub. No.: WO2022/162997
PCT Pub. Date: Aug. 4, 2022

(65) Prior Publication Data
US 2024/0092287 A1   Mar. 21, 2024

(30) Foreign Application Priority Data
Jan. 27, 2021 (JP) .................. 2021-011236

(51) Int. Cl.
*B60R 16/023* (2006.01)
*B60W 50/04* (2006.01)
*B60W 50/14* (2020.01)

(52) U.S. Cl.
CPC ......... *B60R 16/0232* (2013.01); *B60W 50/04* (2013.01); *B60W 50/14* (2013.01)

(58) Field of Classification Search
CPC ... B60R 16/0232; B60W 50/04; B60W 50/14; B60W 2050/041; G06F 1/206
See application file for complete search history.

(56) References Cited

U.S. PATENT DOCUMENTS

| | | | |
|---|---|---|---|
| 2008/0043807 A1* | 2/2008 | Yazawa | G06F 1/324 374/E1.001 |
| 2017/0351279 A1* | 12/2017 | Ishii | G06F 3/0679 |
| 2019/0313548 A1* | 10/2019 | Chonan | G06F 1/206 |

FOREIGN PATENT DOCUMENTS

| | | |
|---|---|---|
| JP | 2004-355421 A | 12/2004 |
| JP | 2013-168107 A | 8/2013 |

(Continued)

OTHER PUBLICATIONS

International Search Report with English Translation and Written Opinion of International Patent Application No. PCT/JP2021/032907 dated Nov. 9, 2021 (8 pages).

*Primary Examiner* — Marc E Norman
(74) *Attorney, Agent, or Firm* — Foley & Lardner LLP (57) ABSTRACT

The present disclosure provides a vehicle control device capable of detecting overheating of a CPU or a heat dissipation failure of the cooling mechanism, while suppressing increases in the size, the number of components, and the cost. A vehicle control device according to the present embodiment includes a memory, a CPU, a temperature sensor that is provided internal of the CPU, and a cooling mechanism that cools the CPU. The memory stores therein a standard pattern SP1, a wait time tw, a standard temperature Ts, and a normal temperature difference. The CPU then stores the load of the CPU in the memory, and monitors the load. When the load changes in accordance with the standard pattern SP1, the CPU calculates a temperature difference $\Delta Tse$ between the standard temperature Ts and an evaluation temperature Te of the temperature sensor at the time point when the wait time tw elapses from the first pattern SP1 has started, and determines a failure when the temperature difference $\Delta Tse$ is larger than the normal temperature difference.

12 Claims, 10 Drawing Sheets

(56) References Cited

FOREIGN PATENT DOCUMENTS

| | | |
|---|---|---|
| JP | 2019-054176 A | 4/2019 |
| JP | 2020-078747 A | 5/2020 |

* cited by examiner

VEHICLE CONTROL DEVICE

TECHNICAL FIELD

The present disclosure relates to a vehicle control device.

BACKGROUND ART

Conventionally, an invention related to a CPU cooling mechanism has been known (PTL 1 below). In the CPU cooling mechanism described in PTL 1, a temperature sensor IC is disposed near the fins of a heat sink, and a failure in the cooling mechanism is detected through the comparison with the temperature during the actual operation, based on statistical calculation data of temperature difference characteristics. As a result, it becomes possible to detect a failure in the cooling mechanism such as a defective physical contact that cannot usually be discovered because the contact surface cannot be visually observed directly (e.g., PTL 1: Abstract).

CITATION LIST

Patent Literature

PTL 1: JP 2004-355421 A

SUMMARY OF INVENTION

Technical Problem

The cooling mechanism described in PTL 1 can detect whether the CPU is being cooled properly by taking a difference between the temperature of CPU and the temperature detected by the temperature sensor IC, during the actual operation, and comparing the difference against a threshold (e.g., paragraph 0013). However, when the conventional cooling mechanism is applied to a vehicle control device, because a temperature sensor IC is required separately from the CPU, the size of the vehicle control device becomes larger, and the number of components and the cost become increased, disadvantageously.

The present disclosure provides a vehicle control device capable of detecting overheating of a CPU or a heat dissipation failure of the cooling mechanism, while suppressing increases in the size, the number of components, and the cost.

Solution to Problem

A vehicle control device according to one an aspect of the present disclosure includes: a memory; a CPU; a temperature sensor that is provided internal of the CPU; and a cooling mechanism that cools the CPU, wherein the memory is configured to store therein: a standard pattern representing a temporal change of a load of the CPU; a wait time from when the standard pattern starts to when an evaluation temperature is acquired by the temperature; a standard temperature of the CPU at a point of time when the wait time has elapsed from when the load of the CPU that is properly operating changes in accordance with the standard pattern; and a normal temperature difference with respect to the standard temperature, the normal temperature difference being a normal temperature difference during a time in which at least one of the CPU and the cooling mechanism is operating properly, and the CPU is configured to: monitor the load of the CPU while storing the load in the memory; calculate, when the load of the CPU changes in accordance with the standard pattern, a temperature difference between the evaluation temperature and the standard temperature at a point of time when the wait time has elapsed from when the standard pattern has started; and determine presence of a failure when the temperature difference is larger than the normal temperature difference.

Advantageous Effects of Invention

According to the aspect of the present disclosure described above, it is possible to provide a vehicle control device capable of detecting overheating of a CPU or a heat dissipation failure of a cooling mechanism, while suppressing increases in the size, the number of components, and the cost.

DESCRIPTION OF EMBODIMENTS

Figure 1:
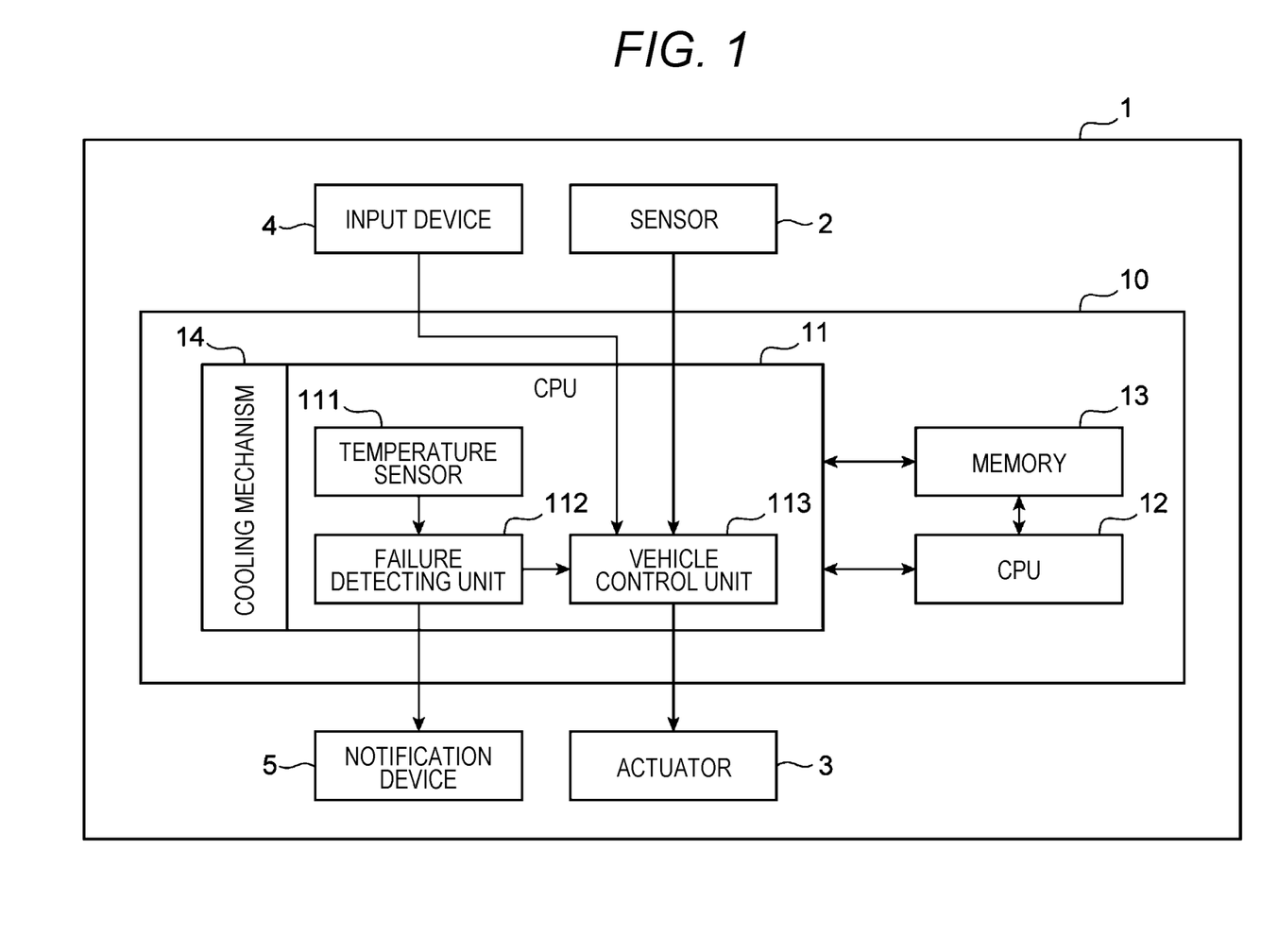
FIG. 1 is a block diagram illustrating an embodiment of a vehicle control device according to the present disclosure.

An embodiment of a vehicle control device according to the present disclosure will now be explained with standard to some drawings. FIG. 1 is a block diagram illustrating an embodiment of the vehicle control device according to the present disclosure.

The vehicle control device 10 according to the present embodiment is provided onboard a vehicle 1, for example, and controls components included in the vehicle 1. Examples of the vehicle 1 include a gasoline engine vehicle, a diesel engine vehicle, a hybrid vehicle, an electric vehicle, and a hydrogen vehicle. The vehicle 1 includes a sensor 2, an actuator 3, an input device 4, and a notification device 5, for example. Other general configurations of the vehicle 1 are omitted in the drawings, and explanations thereof will also be omitted.

The sensor 2 includes, for example, an external sensor and a vehicle sensor. Example of the external sensor include a monocular camera, a stereo camera, a laser radar, a millimeter wave radar, an infrared sensor, and an ultrasonic sensor, and detects an object around the vehicle 1. Examples of the vehicle sensor include a wheel speed sensor, an acceleration sensor, an angular velocity sensor, a Global Navigation Satellite System (GNSS) receiver, an accelerator sensor, a brake sensor, and a steering angle sensor, and detects a speed, an acceleration, an angular velocity, a position, an accelerator operation amount, a brake operation amount, and a steering angle of the vehicle 1, for example.

The actuator 3 drives a power train, a brake device, a steering device, and the like of the vehicle 1 based on a control signal received from the vehicle control device 10, for example, and moves the vehicle 1 forward and backward, accelerates, decelerates, stops, and steers the vehicle 1.

Examples of the input device 4 include a touch panel, an operation button, a line-of-sight detection device, a voice recognition device, and an operation lever. For example, the input device 4 receives an operation and an input from the driver of the vehicle 1, and outputs a signal corresponding to the operation and the input made by the driver to the vehicle control device 10.

Examples of the notification device 5 include a display device, an indicator lamp, a speaker, and a buzzer. For example, based on a signal received from the vehicle control device 10, the notification device 5 notifies the driver of various types of information including a failure of the vehicle control device 10, by presenting various displays on the display device or the indicator lamp, or emitting sound from the speaker or the buzzer.

The vehicle control device 10 controls the actuator 3 based on various types of information detected by the sensor 2, for example, to provide an advanced driving assistance or to perform automatic driving of the vehicle 1. The vehicle control device 10 includes, for example, central processing units (CPU) 11 and 12, a memory 13, and a cooling mechanism 14. The vehicle control device 10 also includes an input/output unit (not illustrated), a timer, and various programs, for example.

The vehicle control device 10 can be configured as one or more microcomputers or firmware, for example. In the example illustrated in FIG. 1, the vehicle control device 10 includes two CPUs 11 and 12, but may include at least one CPU 11. When the CPU 11 has an internal memory, the vehicle control device 10 may not include the memory 13 external of the CPU 11.

The CPU 11 includes, for example, a temperature sensor 111, a failure detecting unit 112, and a vehicle control unit 113. The temperature sensor 111 is a semiconductor temperature sensor that is provided internal of the CPU 11, for example. The temperature sensor 111 is provided as a thermal diode, for example, and detects the temperature of the CPU 11. The failure detecting unit 112 and the vehicle control unit 113 represent the functions of the CPU 11 implemented by causing the CPU 11 to execute a program stored in the memory 13, for example.

For example, the failure detecting unit 112 determines a failure based on the temperature of the CPU 11 detected by the temperature sensor 111. For example, when it is determined that there is some failure, the failure detecting unit 112 outputs a control signal to the notification device 5 to notify the driver of the vehicle 1 of the determined failure. The failure determined by the failure detecting unit 112 includes, for example, overheating of the CPU 11 and heat dissipation failure of the cooling mechanism 14. The overheating of the CPU 11 is, for example, a condition in which the temperature of the CPU 11 has risen higher than that of the properly operating CPU 11, because there is something failure in the CPU 11. The heat dissipation failure of the cooling mechanism 14 will be described later.

The vehicle control unit 113 controls the actuator 3 based on various types of information detected by the sensor 2, for example, to provide an advanced driving assistance or to perform automatic driving of the vehicle 1. More specifically, the vehicle control unit 113 executes control such as cruise control, adaptive cruise control, brake control, or lane keeping assist by controlling the actuator 3, for example. In addition, the vehicle control unit 113 restricts the control to be executed, when some failure is detected by the failure detecting unit 112, for example.

The CPU 12 has the same configuration as that of the CPU 11. The CPU 12 may also include the failure detecting unit 112 and the vehicle control unit 113 provided to the CPU 11, for example. In such a configuration, the failure detecting unit 112 and the vehicle control unit 113 included in the CPU 11 may be omitted. Furthermore, if all the elements illustrated in FIG. 1 are included in the CPU 11, as described above, the CPU 12 may also be omitted.

The memory 13 is implemented as a RAM, for example. The memory 13 may also include a RAM and a ROM. The memory 13 stores therein various programs for implementing the functions of the failure detecting unit 112 and the vehicle control unit 113, for example. The memory 13 may also store therein standard patterns SP1 and SP2 each representing a temporal change in the load of the CPU 11, and a wait time tw (e.g., FIGS. 3 and 4) from when the standard pattern SP1, SP2 starts to when the evaluation temperature Te is acquired by the temperature sensor 111, for example.

The memory 13 also stores therein a standard temperature Ts of the CPU 11 at a time point S2 after the wait time tw has elapsed after changing the load of the properly running CPU 11 in accordance with the standard pattern SP1, SP2, and also stores therein a normal temperature difference $\Delta Tn$ (e.g., FIGS. 3 and 4) with respect to the standard temperature Ts when the CPU 11 and the cooling mechanism 14 are running properly, for example. The memory 13 also stores therein, for example, limitations imposed on the processes performed by the CPU 11, the limitation being imposed depending on a range of a difference between a temperature difference Oise and the normal temperature difference $\Delta Tn$, as will be indicated in Table 1, which will be described later. The memory 13 also stores therein, for example, information received from the CPU 11 and the CPU 12. When the CPU 11 has an internal memory, the information to be stored in the memory 13 may be stored in the internal memory of the CPU 11.

The cooling mechanism 14 includes, for example, a heat dissipation sheet (not illustrated) and a heat sink. The heat dissipation sheet is kept in contacts with the CPU 11, and transfers the heat of the CPU 11 to the heat sink, for example. For example, the heat sink is in contact with the heat dissipation sheet via the heat receiving plate, and has a plurality of fins where the heat of the CPU 11 received from the heat dissipation sheet is dissipated. The cooling mechanism 14 may include a cooling fan that air-cools the fins, and a heat pipe that transfers the heat of the heat receiving plate to the fins.

If the cooling mechanism 14 is installed correctly with respect to the CPU 11, the cooling mechanism 14 can cool the CPU 11 efficiently. However, when the cooling mechanism 14 is experiencing some impairment along the path in which the heat is transferred due to improper installation, or a failure of the cooling fan, for example, the heat dissipation of the CPU 11 may be obstructed, and the temperature of the CPU 11 is more likely to rise, as compared with when the cooling mechanism 14 is operating properly. Such a condition is referred to as a heat dissipation failure of the cooling mechanism 14.

Figure 2:
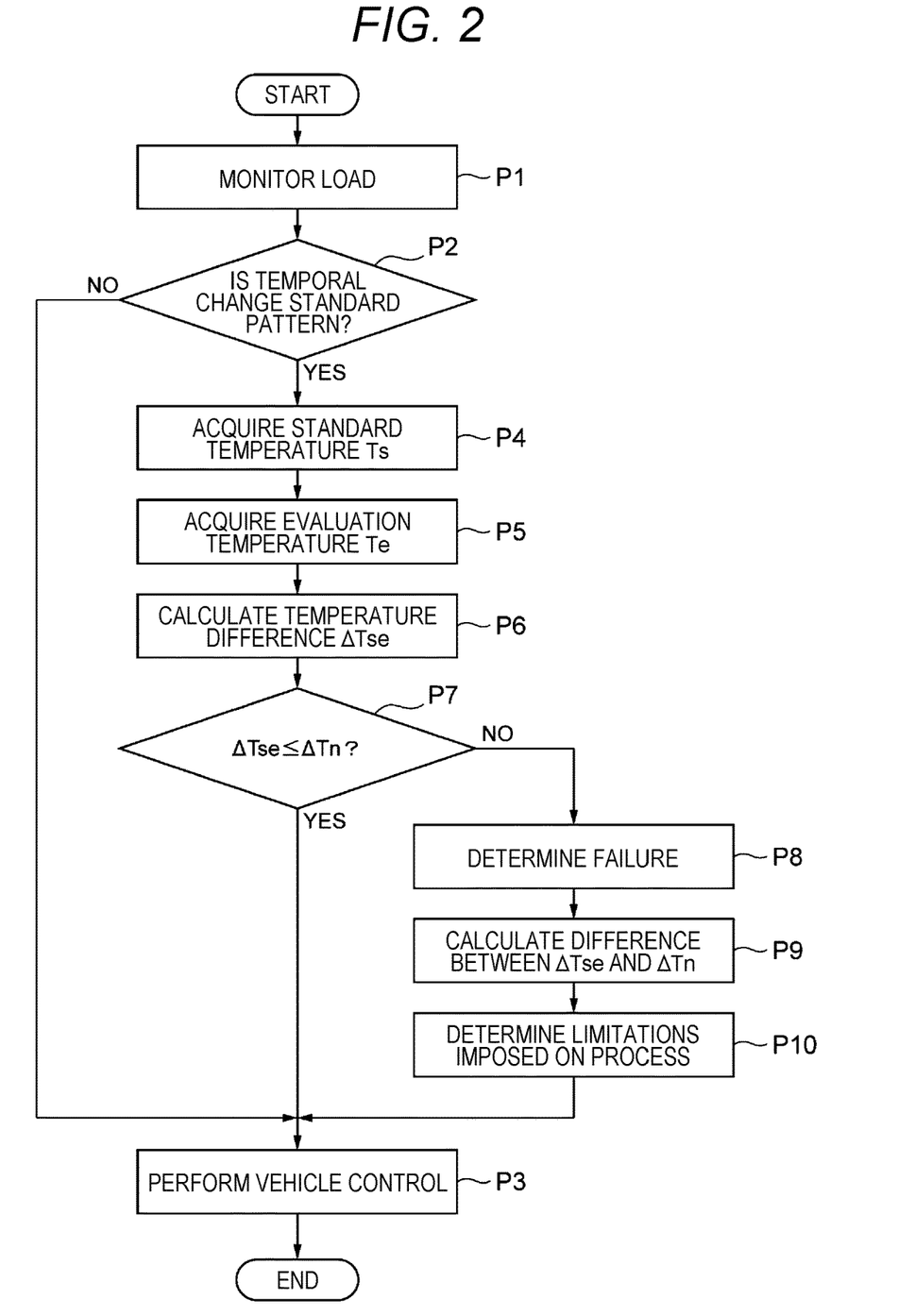
FIG. 2 is a flowchart illustrating an example of processing performed by the vehicle control device in FIG. 1.
Figure 3:
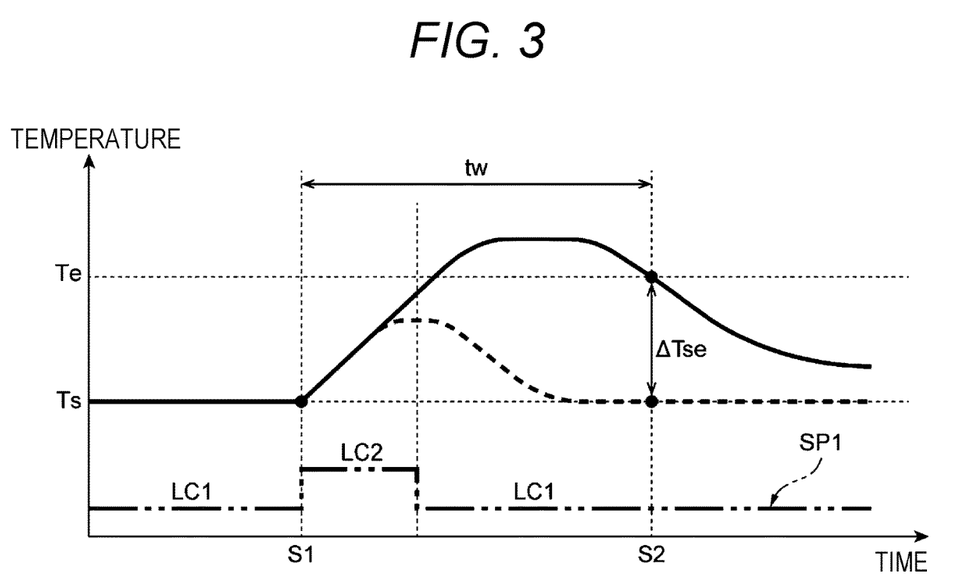
FIG. 3 is a graph illustrating an example of a temperature change of the CPU in FIG. 1.
Figure 4:
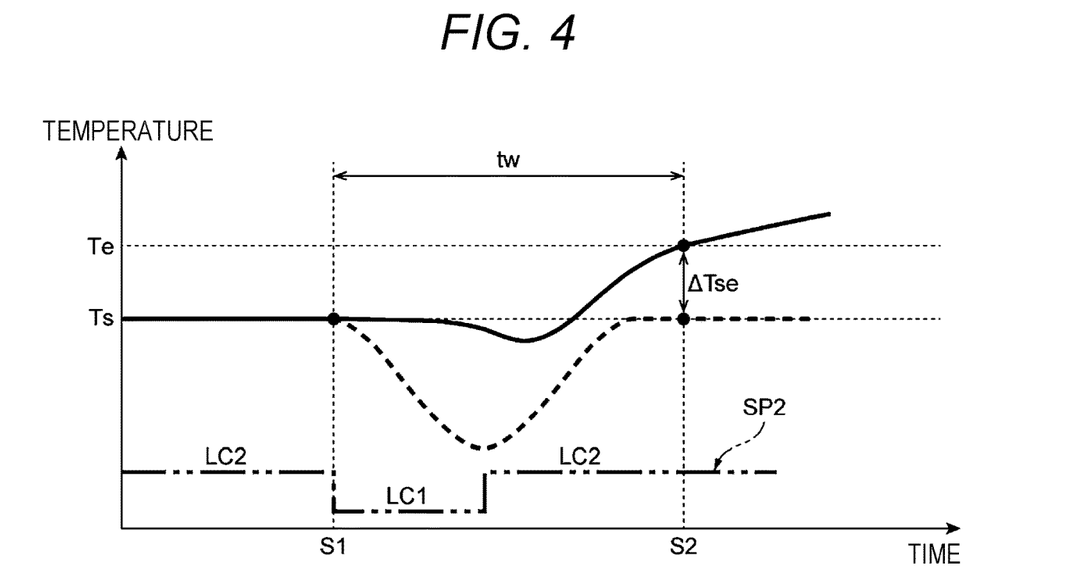
FIG. 4 is a graph illustrating an example of a temperature change of the CPU in FIG. 1.

Processing performed by the vehicle control device 10 according to the present embodiment will now be explained in detail with standard to FIGS. 2 to 10. FIG. 2 is a flowchart illustrating an example of the processing performed by the vehicle control device 10 in FIG. 1. FIGS. 3 and 4 are graphs illustrating examples of a temperature change of the CPU 11 in FIG. 1.

When the processing illustrated in FIG. 2 starts, the vehicle control device 10 executes a process P1 for monitoring the load of the CPU 11, for example. For example, the CPU 11 causes the failure detecting unit 112 to detect a current of the CPU 11, and to store therein time-series data of the current in the memory 13, as a temporal change of the load of the CPU 11, and to monitor the time-series data. Note that the CPU 11 may also store a physical quantity other than the current, such as the temperature detected by the temperature sensor 111, in the memory 13 as the load of the CPU 11. The CPU 11 then causes the failure detecting unit 112 to execute a standard pattern determination process P2, for example.

A driver who is driving the vehicle 1 inputs a request for advanced driving assistance or automatic driving to the vehicle control unit 113 of the vehicle control device 10 via the input device 4 by making an operation of a switch, or with a voice or a line of sight, for example. The CPU 11 then causes the vehicle control unit 113 to execute the vehicle control process related to the advanced driving assistance or the automatic driving, for example. This vehicle control process includes at least one of cruise control, adaptive cruise control, brake control, and lane keeping assist, for example. When the CPU 11 starts the vehicle control process, the processing load of the CPU 11 increases, and the load of the CPU 11 changes.

The vehicle control process mentioned above includes a calculations for processing images of a monocular camera or a stereo camera included in the sensor 2, for example. The vehicle control device 10 also causes the CPU 11 to perform a RAM check when the vehicle 1 is started or stopped, for example. This RAM check includes, for example, a full area RAM check. The RAM check is, for example, a process of detecting a failure in the memory 13. When the CPU 11 executes the image processing calculations and the RAM check, the processing load of the CPU 11 increases, and the load of the CPU 11 changes.

In the standard pattern determination process P2 illustrated in FIG. 2, for example, the CPU 11 causes the failure detecting unit 112 to compare the temporal change in the actual load of the CPU 11 stored in the memory 13, with the standard patterns SP1 and SP2 stored in advance in the memory 13, as illustrated in FIGS. 3 and 4. In this process P2, for example, when the failure detecting unit 112 determines that the actual temporal change of the load of the CPU 11 is different from the standard patterns SP1 and SP2 (NO), the CPU 11 causes the vehicle control unit 113 to execute a vehicle control process P3, for example.

In this process P3, the vehicle control device 10 causes the vehicle control unit 113 in the CPU 11 to execute the vehicle control process related to the advanced driving assistance or the automatic driving described above, for example. In this process P3, the vehicle control device 10 may cause the failure detecting unit 112 in the CPU 11 to execute the RAM check, for example. The vehicle control device 10 then ends the sequence of the process illustrated in FIG. 2. The vehicle control device 10 repeats the sequence of the process illustrated in FIG. 2 at a predetermined cycle.

By contrast, if the failure detecting unit 112 determines that the temporal change in the load of the CPU 11 is equivalent to the standard patterns SP1 and SP2 (YES) in the standard pattern determination process P2 described above, the CPU 11 executes, for example, a process P4 of acquiring the standard temperature Ts. Note that the standard patterns SP1 and SP2 illustrated in FIGS. 3 and 4 indicate temporal changes in the current of the CPU 11, as a temporal change in the load of the CPU 11.

In the example illustrated in FIGS. 3 and 4, the failure detecting unit 112 of the CPU 11 acquires, for example, the standard temperature Ts and the wait time tw of the CPU 11 stored in the memory 13. The standard temperature Ts is a temperature of the properly running CPU 11 at a time point S2 at which the wait time tw has elapsed from the time point S1 at which the standard pattern SP1, SP2 has started by changing the load of the properly running CPU 11 in accordance with the standard patterns SP1 and SP2. In FIGS. 3 and 4, the normal temperature changes of the CPU 11 are indicated by broken lines, and the actual temperature changes of the CPU 11 are indicated by solid lines.

More specifically, the standard patterns SP1, SP2 of the load of the CPU 11 include, for example, a stepwise first pattern SP1 in which the load changes from a first load level LC1 to a second load level LC2 that is higher, and returns to the first load level LC1, as illustrated in FIG. 3. The standard patterns SP1, SP2 of the load of the CPU 11 also include, for example, a stepwise second pattern SP2 in which the load changes from the second load level LC2 to the first load level LC1, and returns to the second load level LC2, as illustrated in FIG. 4.

The first load level LC1 of the CPU 11 is, for example, a load while the CPU 11 is not performing any driving control process, the RAM check, or image calculation process. The second load level LC2 of the CPU 11 is, for example, a load while the CPU 11 is executing at least one of the driving control processing, the RAM check, and the image calculation process.

The wait time tw in the first pattern SP1 is set to, for example, a time required for the temperature of the properly running CPU 11 indicated by the broken line to drop and to stabilize without the use of the cooling mechanism 14, after the load of the properly running CPU 11 has changed in the first pattern SP1, as illustrated in FIG. 3. The wait time tw in the second pattern SP2 is set to, for example, a time required for the temperature of the properly running CPU 11 indicated by the broken line to rise and to stabilize, without the use of the cooling mechanism 14, after the load of the properly running CPU has changed in the second pattern SP2, as illustrated in FIG. 4.

The vehicle control device 10 then performs a process P5 for causing the failure detecting unit 112 of the CPU 11 to acquire an evaluation temperature Te, for example. In this process P5, for example, the failure detecting unit 112 acquires the temperature detected by the temperature sensor 111 at the time point S2 that is time at which the wait time tw has elapsed from the time point S1 at which the standard pattern SP1, SP2 has started, and stores therein the temperature in the memory 13 as the evaluation temperature Te.

The vehicle control device 10 then causes the failure detecting unit 112 of the CPU 11 to execute, for example, a process P6 of calculating the temperature difference ΔTse between the standard temperature Ts of the CPU 11 and the evaluation temperature Te, as illustrated in FIGS. 3 and 4. In this process P6, the failure detecting unit 112 stores the calculated temperature difference ΔTse in the memory 13, for example.

The vehicle control device 10 then causes the failure detecting unit 112 of the CPU 11 to execute a failure determination process P7 illustrated in FIG. 2, for example. In this process P7, the failure detecting unit 112 acquires the temperature difference ΔTse and the normal temperature difference ΔTn from the memory 13, for example, and determines whether the temperature difference ΔTse is equal to or less than the normal temperature difference ΔTn. When the failure detecting unit 112 determines that the temperature difference ΔTse is equal to or less than the normal temperature difference ΔTn (YES) in this process P7, the CPU 11 determines that the CPU 11 is running properly, and executes the vehicle control process P3 described above.

By contrast, in the failure determination process P7, if the failure detecting unit 112 determines that the temperature difference ΔTse is not equal to or less than the normal temperature difference ΔTn (NO), that is, the temperature difference ΔTse is larger than the normal temperature difference ΔTn, the failure detecting unit 112 determines the presence of a failure in the CPU 11. The failure detecting unit 112 then executes, for example, a process P8 for determining a failure type.

In this process P8, the failure detecting unit 112 of the CPU 11 determines whether the cause of the failure is overheating of the CPU 11 or a heat dissipation failure of the cooling mechanism 14. In this process P8, when the temporal change in the load of the CPU 11 is equivalent to the first pattern SP1 illustrated in FIG. 3 or the second pattern SP2 illustrated in FIG. 4, the failure detecting unit 112 determines that the type of the failure determined in the failure determination process P7 is the overheating of the CPU 11.

The vehicle control device 10 causes the failure detecting unit 112 of the CPU 11, for example, to execute a process P9 for calculating the difference between the temperature difference ΔTse and the normal temperature difference ΔTn. The vehicle control device 10 then causes, for example, the failure detecting unit 112 of the CPU 11 to execute a process P10 for determining limitations to be imposed on the processes performed by the CPU 11. In this process P10, the failure detecting unit 112 determines the limitations to imposed on the control by the CPU 11 based on, for example, the determination criteria indicated in Table 1 below.

TABLE 1

| Range of (ΔTse − ΔTn) | Limitations Imposed on Process |
|---|---|
| 10° C. ≤ (ΔTse − ΔTn) < 20° C. | None |
| 20° C. ≤ (ΔTse − ΔTn) < 30° C. | Limit cruise control and adaptive cruise control |
| 30° C. ≤ (ΔTse − ΔTn) < 40° C. | Limit brake control and lane keeping assist |
| 40° C. ≤ (ΔTse − ΔTn) | Stop all vehicle control processes |

The determination criteria as illustrated in Table 1 used by the failure detecting unit 112 in the process P10 are stored in advance in the memory 13, for example. Specifically, in the example illustrated in Table 1, for example, when the difference between the temperature difference ΔTse and the normal temperature difference ΔTn is 10[° C.] or more and less than 20[° C.], the failure detecting unit 112 does not impose any limitation on the vehicle control processes, and notifies the driver of the vehicle 1 of the failure including overheating of the CPU 11 via the notification device 5.

The failure detecting unit 112 sequentially imposes limits on the processes from one the processing load of which is lower to one the processing load of which is higher, according to the increase in the difference between the temperature difference ΔTse and the normal temperature difference ΔTn, for example. Specifically, for example, the failure detecting unit 112 limits the vehicle control processes in the order of the cruise control, the adaptive cruise control, the brake control, and the lane keeping assist, in accordance with an increase in the difference between the temperature difference ΔTse and the normal temperature difference ΔTn.

For example, when the difference between the temperature difference ΔTse and the normal temperature difference ΔTn becomes 40 [ ° C.] or more, the failure detecting unit 112 stops all of the vehicle control processes. For example, before imposing a limitation on or stopping all the of the vehicle control processes, the failure detecting unit 112 sequentially notifies the driver of the vehicle 1 of the vehicle control processes to be limited or stopped, via the notification device 5. The vehicle control device 10 then executes a vehicle control process not limited by the failure detecting unit 112 in the vehicle control process P3, and ends the sequence of the processing illustrated in FIG. 2.

The operation of the vehicle control device 10 according to the present embodiment will now be explained.

As described above, the vehicle control device 10 according to the present embodiment includes the memory 13, the CPU 11, the temperature sensor 111 that is provided internal of the CPU 11, and the cooling mechanism 14 that cools the CPU 11. The memory 13 stores therein, for example, the standard patterns SP1 and SP2, as illustrated respectively in FIGS. 3 and 4, the wait time tw, and the standard temperature Ts, and the normal temperature difference ΔTn, as illustrated in FIG. 2. The standard patterns SP1 and SP2 are temporal changes in the load of the CPU 11. The wait time tw is a time from when the standard pattern SP1, SP2 starts to when the evaluation temperature Te is acquired by the failure detecting unit 112. The standard temperature Ts is the temperature of the CPU 11 at the time when the wait time tw has elapsed after the load of the properly running CPU 11 has changed in accordance with the standard pattern SP1, SP2. The normal temperature difference ΔTn is a temperature difference with respect to the standard temperature Ts when at least one of the CPU 11 and the cooling mechanism 14 is operating properly. The CPU 11 then stores the load of the CPU 11 in the memory 13, and monitors the load. Furthermore, when the load of the CPU 11 changes in accordance with the standard pattern SP1, SP2, the CPU 11 calculates the temperature difference ΔTse between the evaluation temperature Te and the standard temperature Ts at the time point S2 when the wait time tw has elapsed from when the standard pattern SP1, SP2 has started. The CPU 11 then determines that there is some failure when the temperature difference ΔTse is larger than the normal temperature difference ΔTn.

With such a configuration, the vehicle control device 10 according to the present embodiment can determine the presence of a failure, such as overheating of the CPU 11 as described above, without using an additional temperature sensor, other than the temperature sensor 111 provided internal of the CPU 11. Therefore, with the vehicle control device 10 according to the present embodiment, it is possible to detect overheating of the CPU 11, while suppressing increases in the size, the number of parts, and the cost.

In addition, in the vehicle control device 10 according to the present embodiment, the standard patterns SP1 and SP2 include the first pattern SP1, as illustrated in FIG. 3 and the second pattern SP2, as illustrated in FIG. 4. The first pattern SP1 is a pattern in which the load changes from the first load level LC1 to the second load level LC2 that is higher, and returns to the first load level LC1. The second pattern SP2 is a pattern in which the load changes from the second load level LC2 to the first load level LC1, and returns to the second load level LC2. The wait time tw in the first pattern SP1 is set to a time required for the temperature of the CPU 11 to drop and to stabilize without the use of the cooling mechanism 14, after the load of the properly running CPU 11 has changed in the first pattern SP1. The wait time tw in the second pattern SP2 is set to a time required for the temperature of the CPU 11 to rise and to stabilize without the use of the cooling mechanism 14, after the load of the properly running CPU 11 has changed in the second pattern SP2. The CPU 11 then determines that there is overheating of the CPU 11 when the temperature difference ΔTse is larger than the normal temperature difference ΔTn.

With such a configuration, the vehicle control device 10 according to the present embodiment can identify the overheating of the CPU 11 when a failure determined based on the temperature difference ΔTse being larger than the normal temperature difference ΔTn includes at least one of overheating of the CPU 11 and heat dissipation failure of the cooling mechanism 14.

In addition, in the vehicle control device 10 according to the present embodiment, the CPU 11 executes a plurality of processes the processing load of which are different, and imposes a limitation on the processes in accordance with the difference between the temperature difference ΔTse and the normal temperature difference ΔTn. With such a configuration, the vehicle control device 10 according to the present embodiment sequentially imposes limits on, for example, the cruise control, the adaptive cruise control, the brake control, and the lane keeping assist, thereby suppressing the temperature rise of the CPU 11, and preventing the malfunction of the CPU 11, while minimizing the limited processes.

In addition, in the vehicle control device 10 according to the present embodiment, the memory 13 stores therein the limitations imposed on the processes of the CPU 11, the limitation being imposed depending on the difference between the temperature difference ΔTse and the normal temperature difference ΔTn, as indicated in Table 1 described above. The CPU 11 limits the processes performed by the CPU 11, depending on the difference between the temperature difference ΔTse and the normal temperature difference ΔTn. With such a configuration, the vehicle control device 10 according to the present embodiment can suppress the temperature rise of the CPU 11 more effectively, prevent the malfunction of the CPU 11 more reliably, and improve the safety of the vehicle 1.

In addition, in the vehicle control device 10 according to the present embodiment, when any limitation is to be imposed on the processes of the CPU 11, the CPU 11 causes the notification device 5 to notify the CPU 11 of the processes to be limited. With such a configuration, the vehicle control device 10 according to the present embodiment can notify the driver of the vehicle 1 of the vehicle control processes to be limited and stopped by the CPU 11, so that the safety of the vehicle 1 can be further improved.

In addition, in the vehicle control device 10 according to the present embodiment, the second load level LC2 is a level in which the CPU 11 is executing the RAM check or the image calculation process. With such a configuration, in the second load level LC2, the vehicle control device 10 according to the present embodiment can detect a failure including overheating of the CPU 11 or a heat dissipation failure of the cooling mechanism 14, when the CPU 11 executes the RAM check or the image calculation process.

In the vehicle control device 10 according to the present embodiment, the first load level LC1 is a level where the CPU 11 is running none of the driving control processes, the RAM check, and the image calculation process. With such a configuration, the vehicle control device 10 according to the present embodiment can detect a failure including overheating of the CPU 11 or a heat dissipation failure of the cooling mechanism 14 when the CPU 11 executes at least one of the driving control processes, the RAM check, or the image calculation process.

Note that the vehicle control device 10 according to the present embodiment is not limited to the configuration described above. For example, when the CPU 12 includes the failure detecting unit 112, the CPU 12 can detect failure including overheating of the CPU 11 or a heat dissipation failure of the cooling mechanism 14. Some modifications of the vehicle control device 10 according to the embodiment escribed above will now be explained.

Figure 5:
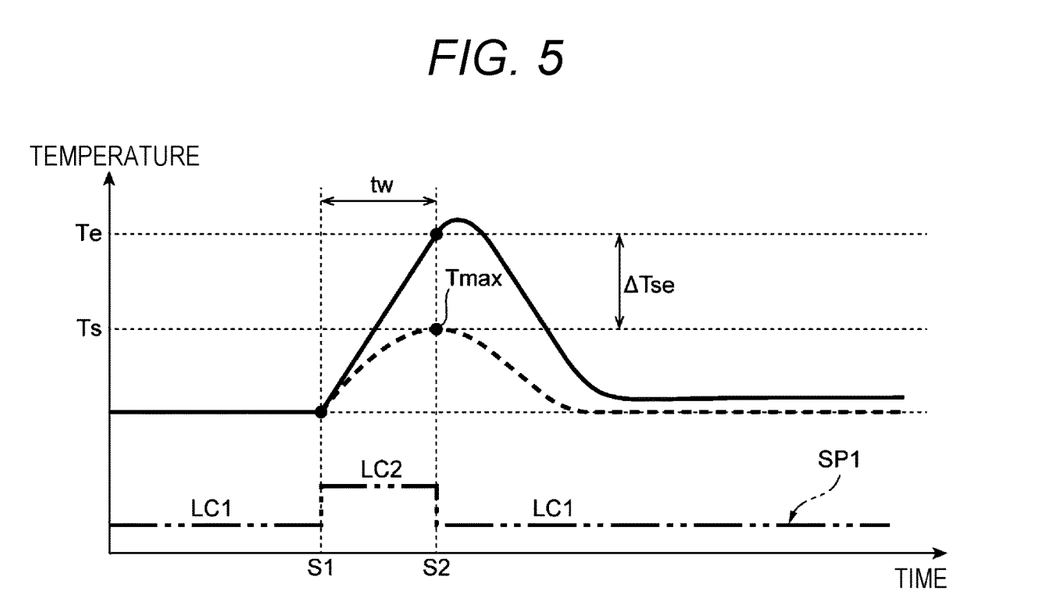
FIG. 5 is a graph illustrating an example of a temperature change of the CPU in FIG. 1.
Figure 6:
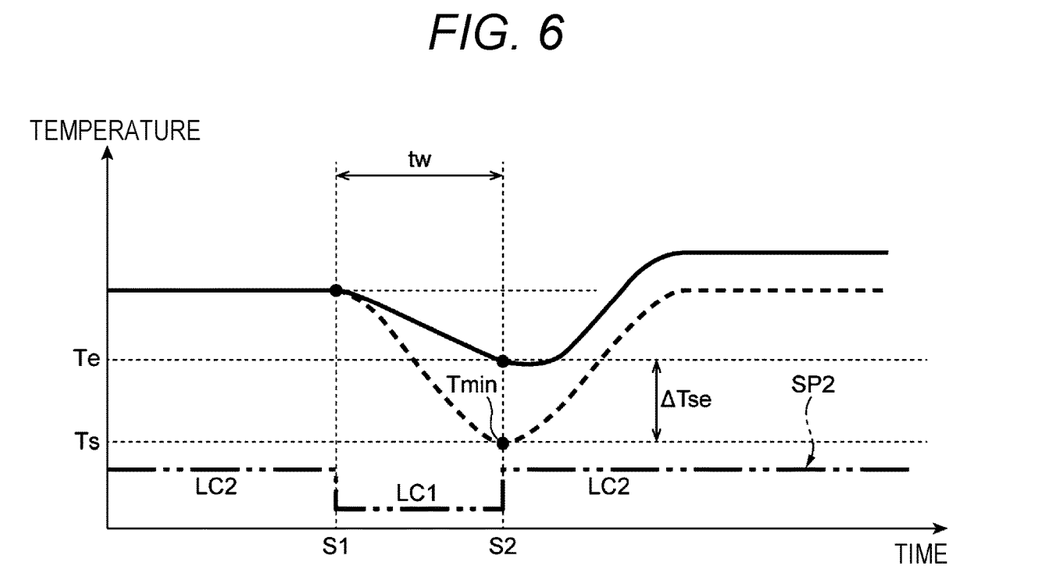
FIG. 6 is a graph illustrating an example of a temperature change of the CPU in FIG. 1.

FIGS. 5 and 6 are graphs illustrating temperature changes of the CPU 11 according to a first modification of the vehicle control device 10. In the examples illustrated in FIGS. 5 and 6, the standard patterns SP1 and SP2 include the first pattern SP1 and the second pattern SP2, in the same manner as the examples illustrated in FIGS. 3 and 4. More specifically, in the first pattern SP1, the load changes from the first load level LC1 to the second load level LC2 that is higher, and returns to the first load level LC1. The second pattern SP2 changes from the second load level LC2 to the first load level LC1, and returns to the second load level LC2. In the example illustrated in FIG. 5, the wait time tw in the first pattern SP1 is set to a time required for the temperature of the CPU 11 to rise and to reach a maximum temperature Tmax when the load of the CPU 11 changes in accordance with the first pattern SP1 in a condition in which the CPU 11 is properly running and can dissipate heat properly via the cooling mechanism 14. In addition, the wait time tw in the second pattern SP2 is set to a time required for the temperature of the CPU 11 to drop and to reach a minimum temperature Tmin when the load of the CPU 11 changes in accordance with the second pattern SP2 in a condition in which the CPU 11 is properly running and can dissipate heat properly via the cooling mechanism 14.

In the first modification, the memory 13 stores therein a maximum temperature Tmax in a condition in which the temporal change of the load of the CPU 11 is equivalent to the first pattern SP1 illustrated in FIG. 5, as the standard temperature Ts. The CPU 11 then acquires the temperature of the CPU 11 at the time point S2 at which the load changes from the second load level LC2 to the first load level LC1, in accordance with the first pattern SP1, as the evaluation temperature Te. If the temperature difference ΔTse between the evaluation temperature Te and the standard temperature Ts is larger than the normal temperature difference ΔTn, the CPU 11 can determine the presence of a failure including overheating of the CPU 11 or a heat dissipation failure of the cooling mechanism 14.

In the first modification, the memory 13 stores the minimum temperature Tmin described above in a condition in which the temporal change of the load of the CPU 11 is equivalent to the second pattern SP2 illustrated in FIG. 6, as the standard temperature Ts. The CPU 11 then acquires the temperature of the CPU 11 at the time point S2 at which the load changes from the first load level LC1 to the second load level LC2 in accordance with the second pattern SP2, as the evaluation temperature Te. If the temperature difference Oise between the evaluation temperature Te and the standard temperature Ts is larger than the normal temperature difference ΔTn, the CPU 11 can determine the presence of a failure including overheating of the CPU 11 or a heat dissipation failure of the cooling mechanism 14.

Therefore, with the vehicle control device 10 according to the first modification illustrated in FIGS. 5 and 6, not only a failure can be determined, in the same manner as with the vehicle control device 10 according to the embodiment described above, but also the presence of a failure can be determined in a shorter time period. The condition in which the CPU 11 is properly running and can dissipate heat properly via the cooling mechanism 14 means a condition in which the cooling mechanism 14 is positioned correctly with respect to the properly running CPU 11, and can dissipate heat as designed. In other words, a condition in which the cooling mechanism 14 cannot dissipate heat appropriately is a condition in which the heat dissipation of the CPU 11 is obstructed, e.g., there is some impairment in the path in which heat is transferred, due to improper installation of the cooling mechanism 14, or there is a failure in the cooling fan.

Figure 7:
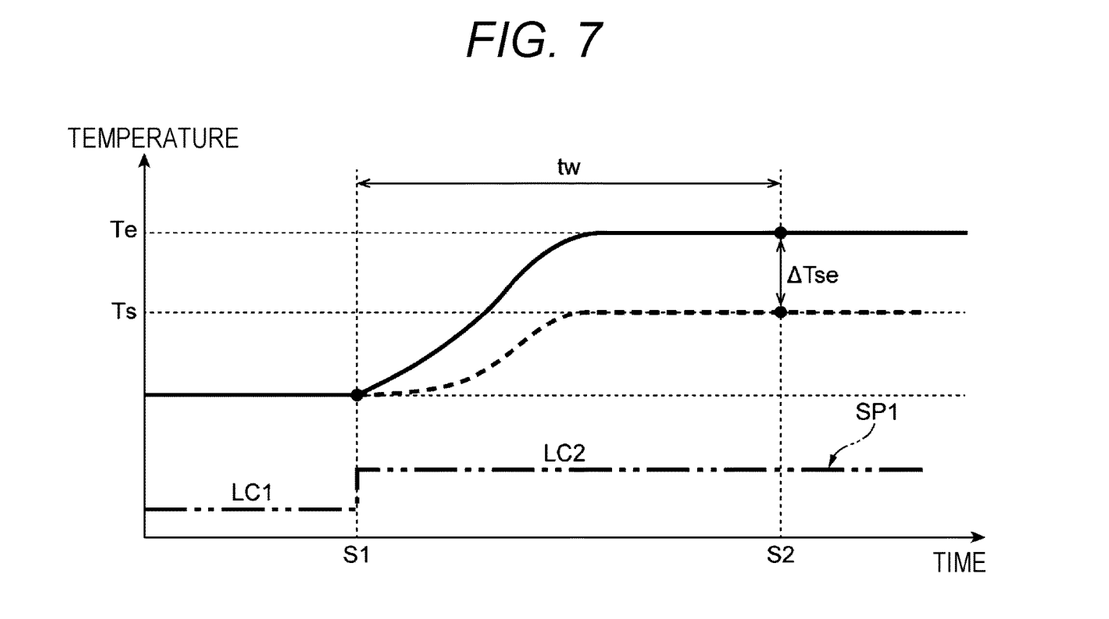
FIG. 7 is a graph illustrating an example of a temperature change of the CPU in FIG. 1.
Figure 8:
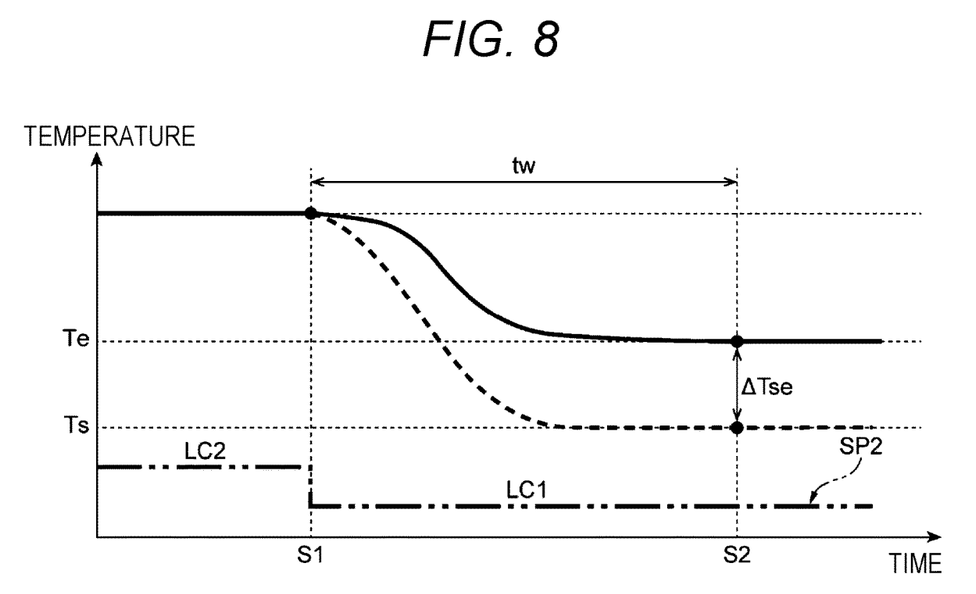
FIG. 8 is a graph illustrating an example of a temperature change of the CPU in FIG. 1.

FIGS. 7 and 8 are graphs illustrating temperature changes of the CPU 11 according to a second modification of the vehicle control device 10. In the examples illustrated in FIGS. 7 and 8, the standard patterns SP1 and SP2 include the first pattern SP1 and the second pattern SP2, in the same manner as the examples illustrated in FIGS. 3 and 4. More specifically, in the first pattern SP1, the load changes from the first load level LC1 to the second load level LC2 that is higher, and remains at this level. The second pattern SP2 changes from the second load level LC2 to the first load level LC1 and maintains the state. The wait time tw in the first pattern SP1 is set to a time required for the temperature of the CPU 11 to rise and to stabilize, when the load of the CPU 11 changes in accordance with the first pattern SP1 in a condition in which the CPU 11 is properly running and can dissipate heat properly via the cooling mechanism 14. The wait time tw in the second pattern SP2 is set to a time required for the temperature of the CPU 11 to drop and to stabilize, when the load of the CPU 11 changes in accordance with the second pattern SP2 in a condition in which the CPU 11 is properly running and can dissipate heat properly via the cooling mechanism 14.

In the second modification, the CPU 11 acquires the temperature of the CPU 11 at the time point S2 at which the temperature of the CPU 11 stabilizes after the load of the CPU 11 has changed in accordance with the standard pattern SP1 and SP2, as the evaluation temperature Te. In addition, the standard temperatures Ts of the CPU 11 at the time when the wait time tw has elapsed while changing the load of the properly running CPU 11 in accordance with the standard patterns SP1 and SP2, respectively, are stored in the memory 13 in advance. If the temperature difference $\Delta Tse$ between the evaluation temperature Te and the standard temperature Ts is larger than the normal temperature difference $\Delta Tn$, the CPU 11 can determine the presence of a failure including overheating of the CPU 11 or a heat dissipation failure of the cooling mechanism 14. With the vehicle control device 10 according to the second modification, not only the same effects as those of the vehicle control device 10 of the embodiment described above can be achieved, but also problems including overheating of the CPU 11 and heat dissipation failure of the cooling mechanism 14 can be determined using simpler standard patterns SP1 and SP2.

In the second modification, the second load level LC2 in the first pattern SP1 is, for example, a load while the CPU 11 is executing the full area RAM check or the cruise control. As a result, the vehicle control device 10 can detect overheating of the CPU 11 or a heat dissipation failure of the cooling mechanism 14 while the CPU 11 is performing the full area RAM check or the cruise control. The second load level LC2 in the second pattern SP2 is, for example, a load while the CPU 11 is executing the vehicle control. As a result, the vehicle control device 10 can detect overheating of the CPU 11 or a heat dissipation failure of the cooling mechanism 14 while the CPU 11 is performing the vehicle control.

Figure 9:
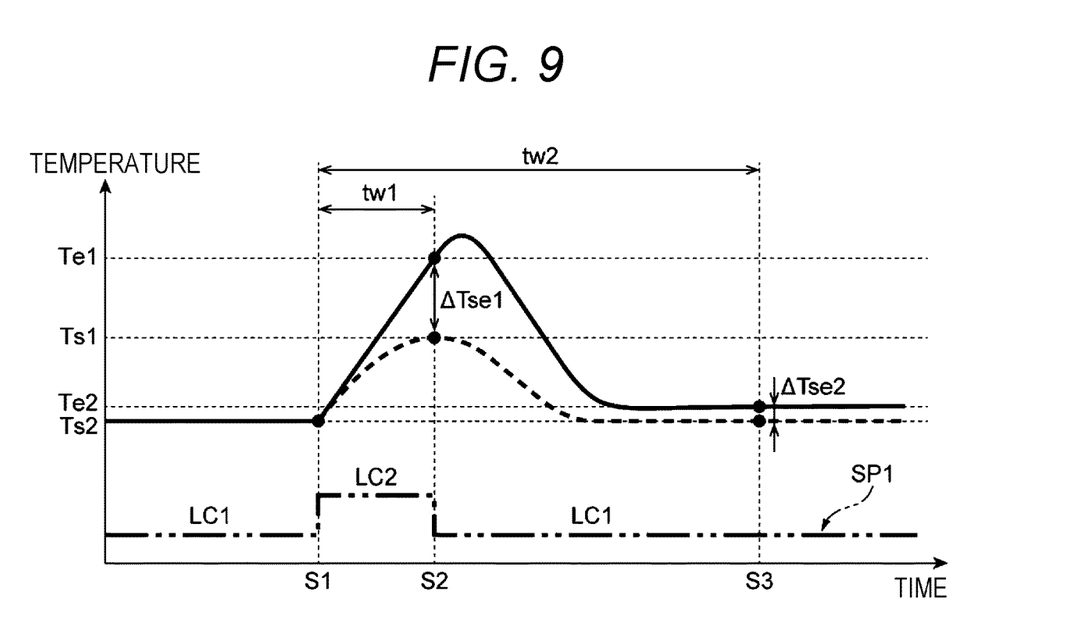
FIG. 9 is a graph illustrating an example of a temperature change of the CPU in FIG. 1.
Figure 10:
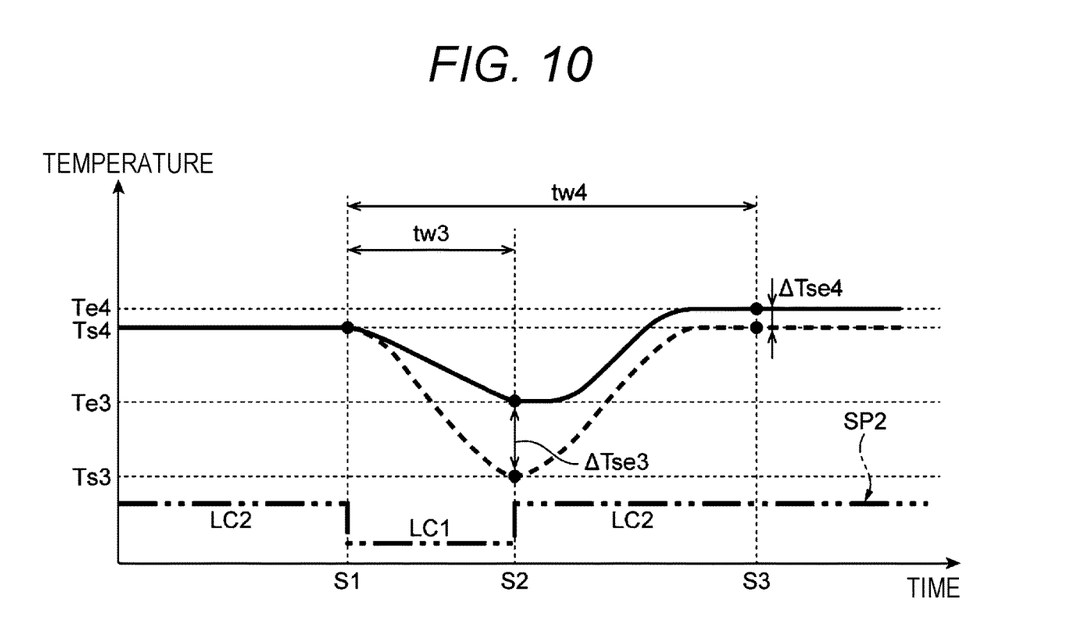
FIG. 10 is a graph illustrating an example of a temperature change of the CPU in FIG. 1.

FIGS. 9 and 10 are graphs illustrating temperature changes of the CPU 11 according to a third modification of the vehicle control device 10. In the examples illustrated in FIGS. 9 and 10, the standard patterns SP1 and SP2 include the first pattern SP1 and the second pattern SP2, in the same manner as the examples illustrated in FIGS. 3 and 4. More specifically, in the first pattern SP1, the load changes from the first load level LC1 to the second load level LC2 that is higher, and returns to the first load level LC1. The second pattern SP2 changes from the second load level LC2 to the first load level LC1, and returns to the second load level LC2.

In the third modification, the wait time tw in the first pattern SP1 includes a first wait time tw1 and a second wait time tw2. The first wait time tw1 is a time required for the temperature of the CPU 11 to rise and to reach the maximum temperature, when the load of the CPU 11 changes in accordance with the first pattern SP1 in a condition in which the CPU 11 is properly running and can dissipate heat properly via the cooling mechanism 14. The second wait time tw2 is a time required for the temperature of the CPU 11 to rise and to reach the maximum temperature, and for the temperature of the CPU 11 to further drop and to stabilize, while the load of the CPU 11 changes in accordance with the first pattern SP1.

In the third modification, the wait time tw in the second pattern SP2 includes a third wait time tw3 and a fourth wait time tw4. The third wait time tw3 is a time required for the temperature of the CPU 11 to drop and to reach the minimum temperature, when the load of the CPU 11 changes in accordance with the second pattern SP2 in a condition in which the CPU 11 is properly running and can dissipate heat properly via the cooling mechanism 14. The fourth wait time tw4 is a time required for the temperature of the CPU 11 to drop and to reach the minimum temperature, and for the temperature of the CPU 11 to further rise and stabilize, when the load of the CPU 11 changes in accordance with the second pattern SP2 in a condition in which the CPU 11 is properly running and can dissipate heat properly via the cooling mechanism 14.

In the third modification, the CPU 11 determines overheating of the CPU 11 when the temperature difference $\Delta Tse1$ between the standard temperature Ts' and the evaluation temperature Te1 has remained larger than the normal temperature difference $\Delta Tn1$ during the first wait time tw1, and the temperature difference $\Delta Tse2$ has remained equal to the normal temperature difference $\Delta Tn2$ or smaller than the normal temperature difference $\Delta Tn2$ during the second wait time tw2. Furthermore, the CPU 11 determines the presence of a heat dissipation failure of the cooling mechanism 14 when the temperature difference $\Delta Tse1$ has remained equal to the normal temperature difference $\Delta Tn1$ or smaller than the normal temperature difference $\Delta Tn1$ during the first wait time tw1, and the temperature difference $\Delta Tse2$ remains larger than the normal temperature difference $\Delta Tn2$ during the second wait time tw2.

In the third modification, the CPU 11 determines overheating of the CPU 11 when the temperature difference $\Delta Tse3$ has remained larger than a normal temperature difference ΔTn3 during the third wait time tw3, and the temperature difference ΔTse4 has remained equal to the normal temperature difference ΔTn4 or smaller than the normal temperature difference ΔTn4 during the fourth wait time tw4. Furthermore, the CPU 11 determines the presence of a heat dissipation failure of the cooling mechanism 14 when the temperature difference ΔTse3 has remained equal to the normal temperature difference ΔTn3 or smaller than the normal temperature difference ΔTse3 during the third wait time tw3, and the temperature difference ΔTse4 remains larger than the normal temperature difference ΔTn4 during the fourth wait time tw4.

With the vehicle control device 10 according to the third modification, it is possible to distinguish overheating of the CPU 11 from the heat dissipation failure of the cooling mechanism 14, in the same manner as with the vehicle control device 10 according to the embodiments described above. As described above, according to the present embodiment and the modification thereof, it is possible to provide a vehicle control device 10 capable of detecting overheating of the CPU 11 or a heat dissipation failure of the cooling mechanism 14, while suppressing increases in the size, the number of components, and the cost.

Although the embodiment of the vehicle control device according to the present disclosure has been described in detail with standard to the drawings, the specific configurations are not limited to those disclosed in the embodiments, and any design changes and the like made within the scope not without departing from the gist of the present disclosure fall within the scope of the present disclosure.

REFERENCE SIGNS LIST 5 notification device
10 vehicle control device
11 CPU
111 temperature sensor
13 memory
14 cooling mechanism
LC1 first load
LC2 second load
SP1 first pattern (standard pattern)
SP2 second pattern (standard pattern)
Te evaluation temperature
Ts standard temperature
tw wait time
tw1 first wait time
tw2 second wait time
tw3 third wait time
tw4 fourth wait time
ΔTn normal temperature difference
ΔTn1 normal temperature difference
ΔTn2 normal temperature difference
ΔTn3 normal temperature difference
ΔTn4 normal temperature difference
ΔTse temperature difference
ΔTse1 temperature difference
ΔTse2 temperature difference
ΔTse3 temperature difference
ΔTse4 temperature difference

The invention claimed is:

1. A vehicle control device comprising:
a memory;
a CPU;
a temperature sensor that is provided internal of the CPU; and
a cooling mechanism that cools the CPU, wherein
the memory is configured to store therein:
a standard pattern representing a temporal change of a load of the CPU;
a wait time from when the standard pattern starts to when an evaluation temperature is acquired by the temperature sensor;
a standard temperature of the CPU at a point of time when the wait time has elapsed from when the load of the CPU that is properly operating changes in accordance with the standard pattern; and
a normal temperature difference with respect to the standard temperature, the normal temperature difference being a normal temperature difference during a time in which at least one of the CPU and the cooling mechanism is operating properly, and
the CPU is configured to:
monitor the load of the CPU while storing the load in the memory;
calculate, when the load of the CPU changes in accordance with the standard pattern, a temperature difference between the evaluation temperature and the standard temperature at a point of time when the wait time has elapsed from when the standard pattern has started; and
determine presence of a failure when the temperature difference is larger than the normal temperature difference.

2. The vehicle control device according to claim 1, wherein
the standard pattern includes a first pattern that changes from a first load to a second load that is higher, and returns to the first load, and a second pattern that changes from the second load to the first load, and returns to the second load,
the wait time in the first pattern is set to a time required for the temperature of the CPU to drop and to stabilize, without the use of the cooling mechanism, after the load of the CPU that is properly operating has changed in the first pattern,
the wait time in the second pattern is set to a time required for the temperature of the CPU to rise and to stabilize, without the use of the cooling mechanism, after the load of the CPU that is properly operating has changed in the second pattern, and
the CPU determines overheating of the CPU when the temperature difference is larger than the normal temperature difference.

3. The vehicle control device according to claim 2, wherein the second load is a load while the CPU is executing a RAM check or an image calculation process.

4. The vehicle control device according to claim 2, wherein the first load is a load while the CPU is executing none of a driving control process, a RAM check, and an image calculation process.

5. The vehicle control device according to claim 1, wherein
the standard pattern includes a first pattern that changes from a first load to a second load that is higher, and returns to the first load, and a second pattern that changes from the second load to the first load, and returns to the second load,
the wait time in the first pattern is set to a time required for the temperature of the CPU to rise and to reach a maximum temperature when the load of the CPU changes in accordance with the first pattern in a condition in which the CPU is properly operating and heat is dissipated properly via the cooling mechanism, and the wait time in the second pattern is set to a time required for the temperature of the CPU to drop and to reach a minimum temperature when the load of the CPU changes in accordance with the second pattern in a condition in which the CPU is properly operating and heat is dissipated properly via the cooling mechanism.

6. The vehicle control device according to claim 1, wherein the standard pattern includes a first pattern that changes from a first load to a second load that is higher, and a second pattern that changes from the second load to the first load, the wait time in the first pattern is set to a time required for the temperature of the CPU to rise and to stabilize when the load of the CPU changes in accordance with the first pattern in a condition in which the CPU is properly operating and heat is dissipated properly via the cooling mechanism, and the wait time in the second pattern is set to a time required for the temperature of the CPU to drop and to stabilize when the load of the CPU changes in accordance with the second pattern in a condition in which the CPU is properly operating and heat is dissipated properly via the cooling mechanism.

7. The vehicle control device according to claim 6, wherein the second load in the first pattern is a load while the CPU is executing a full area RAM check or cruise control.

8. The vehicle control device according to claim 6, wherein the second load in the second pattern is a load while the CPU is executing vehicle control.

9. The vehicle control device according to claim 1, wherein the standard pattern includes a first pattern that changes from a first load to a second load that is higher, and returns to the first load, and a second pattern that changes from the second load to the first load, and returns to the second load, the wait time in the first pattern includes a first wait time required for the temperature of the CPU to rise and to reach a maximum temperature, and a second wait time required for the temperature of the CPU to drop and to stabilize, when the load of the CPU changes in accordance with the first pattern in a condition in which the CPU is properly operating and heat is dissipated properly via the cooling mechanism, the wait time in the second pattern includes a third wait time required for the temperature of the CPU to drop and to reach a minimum temperature, and a fourth wait time required for the temperature of the CPU to rise and to stabilize, when the load of the CPU changes in accordance with the second pattern in a condition in which the CPU is properly operating and heat is dissipated properly via the cooling mechanism, the CPU is configured to:

determine overheating of the CPU when the temperature difference in the first wait time is larger than the normal temperature difference, and the temperature difference in the second wait time is equal to or smaller than the normal temperature difference;

determine a heat dissipation failure of the cooling mechanism when the temperature difference in the first wait time is equal to or smaller than the normal temperature difference, and the temperature difference in the second wait time is larger than the normal temperature difference;

determine overheating of the CPU when the temperature difference in the third wait time is larger than the normal temperature difference, and the temperature difference in the fourth wait time is equal to or smaller than the normal temperature difference; and determine a heat dissipation failure of the cooling mechanism when the temperature difference in the third wait time is equal to or smaller than the normal temperature difference, and the temperature difference in the fourth wait time is larger than the normal temperature difference.

10. The vehicle control device according to claim 1, wherein the CPU executes a plurality of processes having different processing loads, and imposes a limitation on the processes depending on a difference between the temperature difference and the normal temperature difference.

11. The vehicle control device according to claim 10, wherein the memory stores therein the limitation imposed on the processes of the CPU depending on the difference between the temperature difference and the normal temperature difference, and the CPU imposes the limitation on the processes depending on the difference between the temperature difference and the normal temperature difference.

12. The vehicle control device according to claim 11, wherein the CPU makes a notification of the limitation imposed on the processes, via a notification device when the limitation is imposed on the processes.

* * * * *